(No Model.)  4 Sheets—Sheet 1.
M. G. HUBBARD.
COMBINED BRAKE AND CAR STARTER.
No. 362,159.  Patented May 3, 1887.
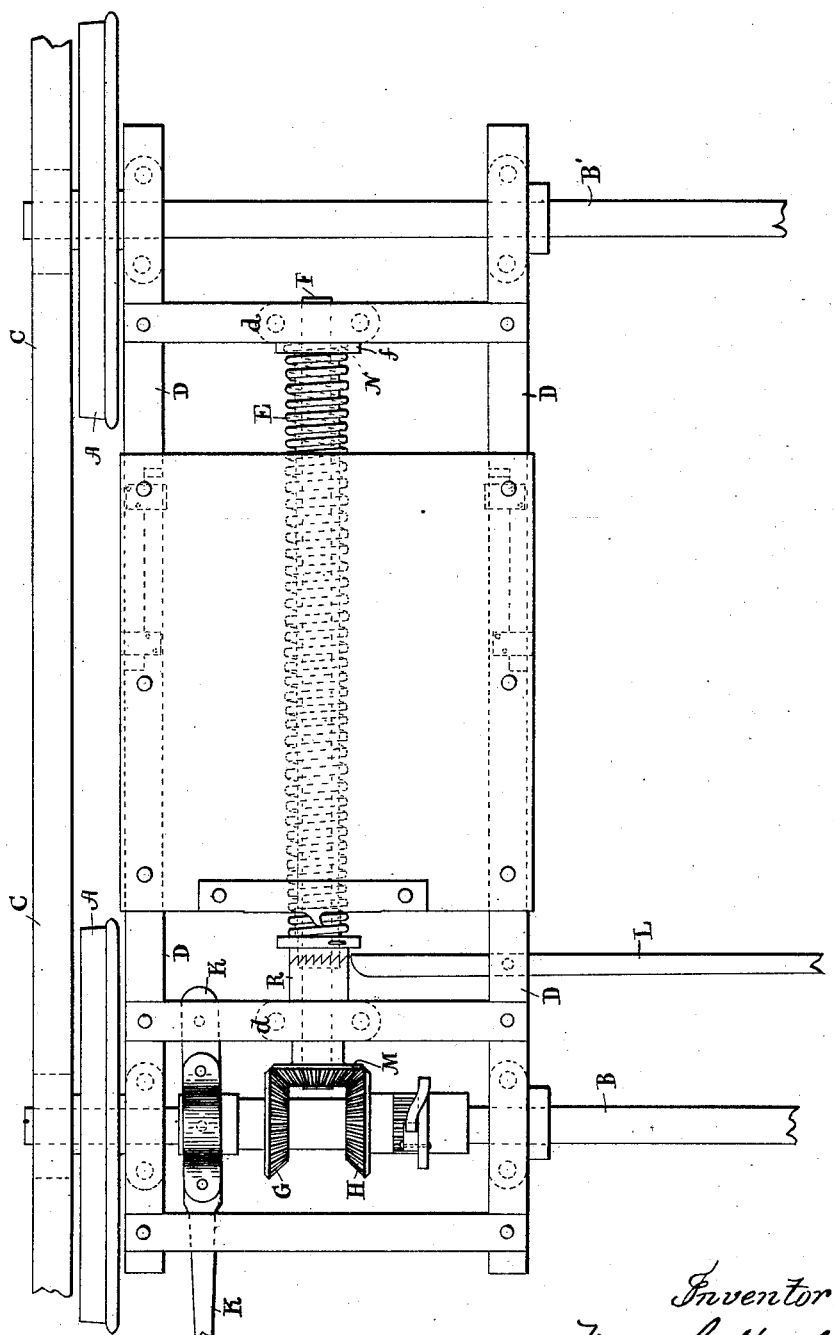

(No Model.) 4 Sheets—Sheet 2.
M. G. HUBBARD.
COMBINED BRAKE AND CAR STARTER.
No. 362,159. Patented May 3, 1887.
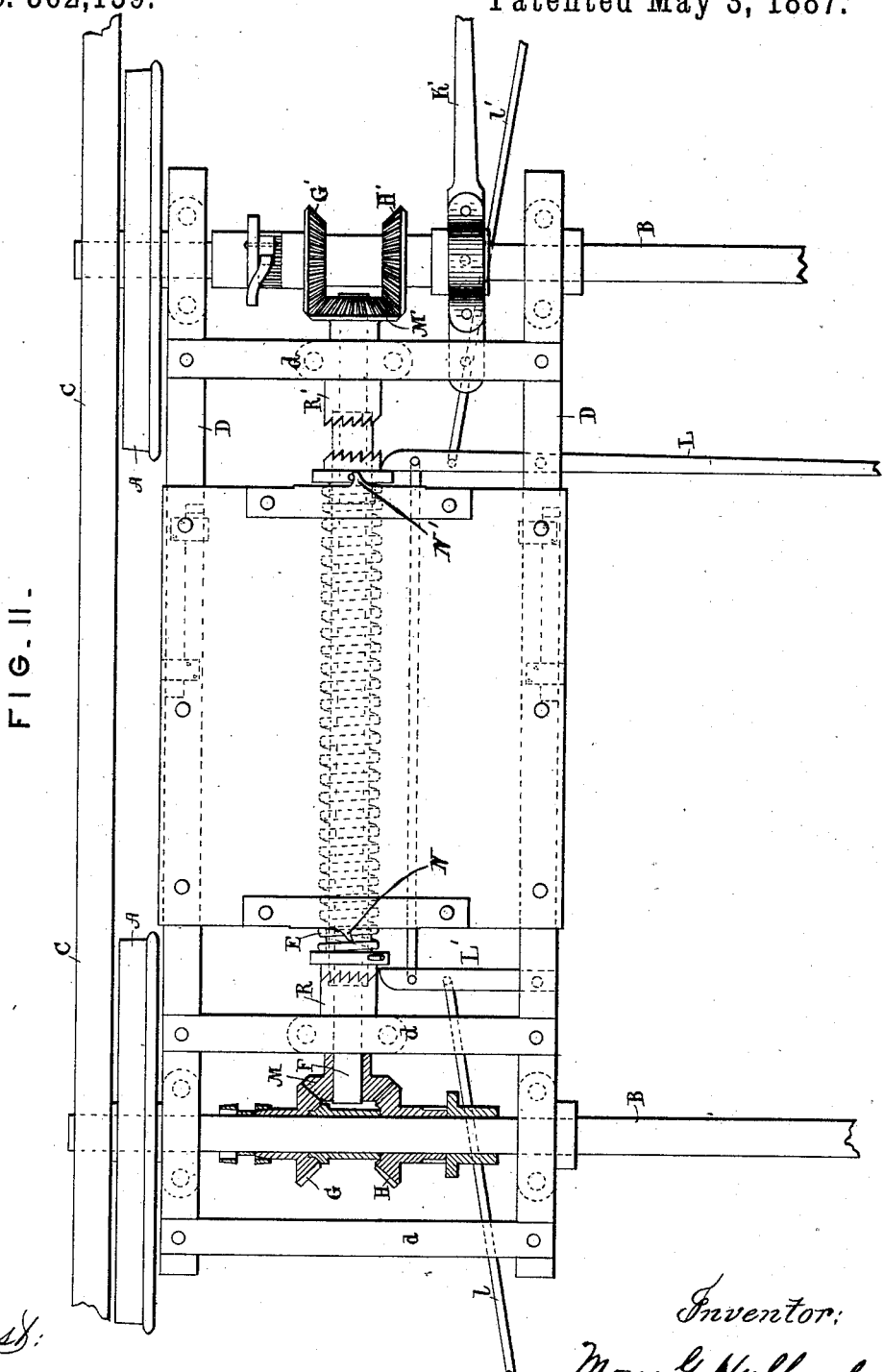
FIG. II.
Attest:
Geo. T. Smallwood.
Jas. K. McCathran.
Inventor:
Moses G. Hubbard
By A. M. Smith
atty.

(No Model.) 4 Sheets—Sheet 3.
M. G. HUBBARD.
COMBINED BRAKE AND CAR STARTER.
No. 362,159. Patented May 3, 1887.
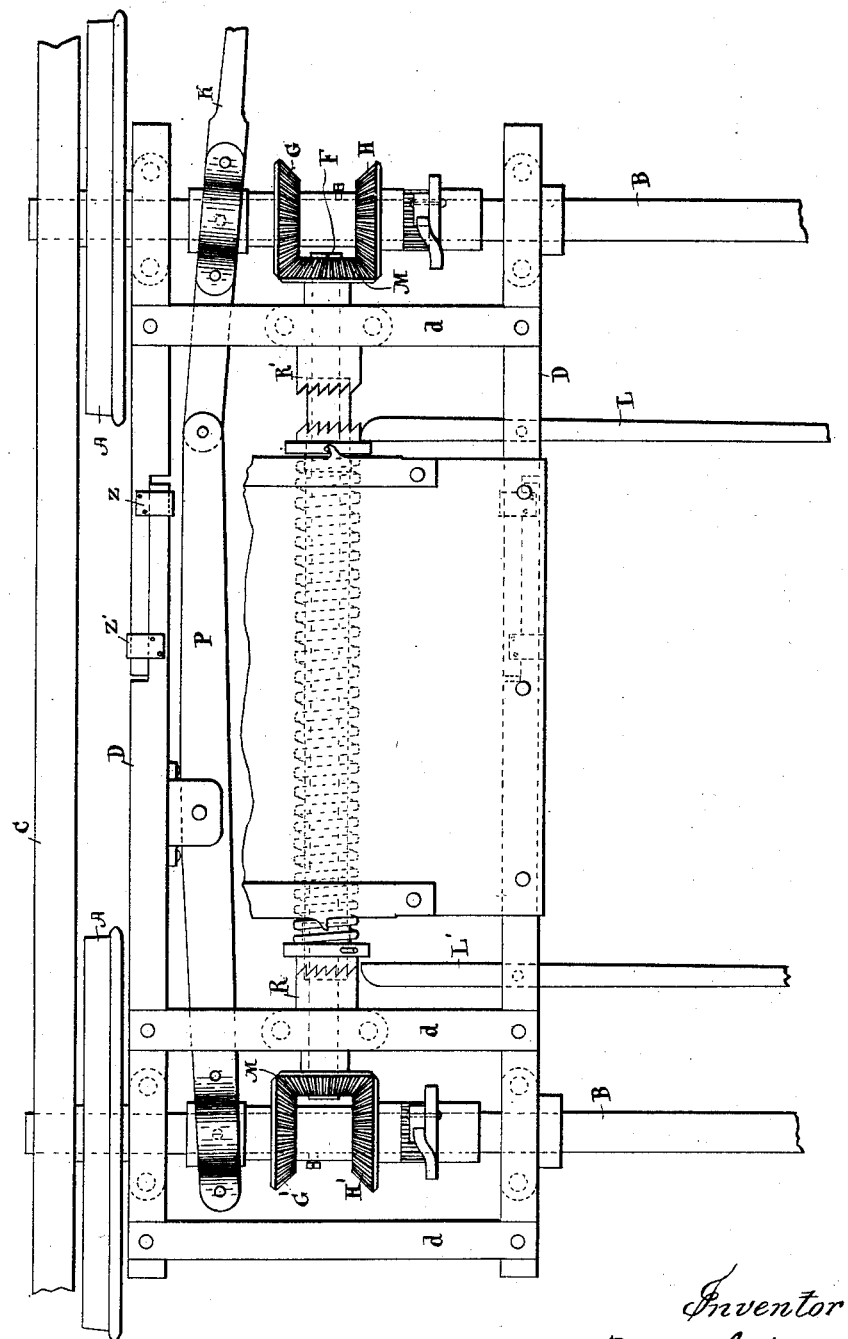
Attest:
Geo. T. Smallwood.
Jas. K. McCathran.
Inventor
Moses G. Hubbard
By A. M. Smith
atty.

(No Model.) 4 Sheets—Sheet 4.
M. G. HUBBARD.
COMBINED BRAKE AND CAR STARTER.
No. 362,159. Patented May 3, 1887.
F I G _ IV _
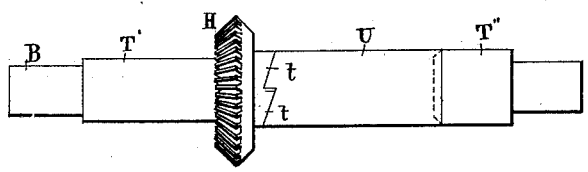
F I G _ V _
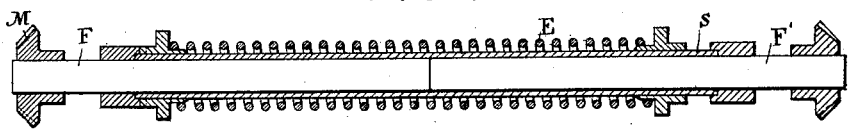
F I G _ VI _
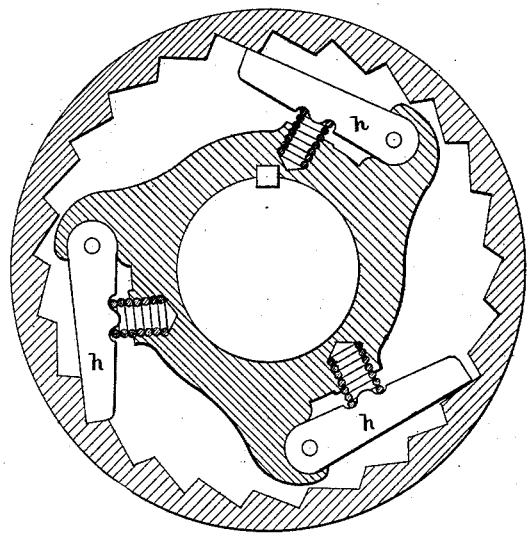
Attest:
Geo. T. Smallwood.
Jas. K. McCathran.
Inventor:
Moses G. Hubbard
by A. M. Smith
atty.

UNITED STATES PATENT OFFICE.

MOSES G. HUBBARD, OF PHILADELPHIA, PENNSYLVANIA, ASSIGNOR TO THE MOMENTUM CAR BRAKE COMPANY, (LIMITED.)

COMBINED BRAKE AND CAR-STARTER.

SPECIFICATION forming part of Letters Patent No. 362,159, dated May 3, 1887.

Application filed July 31, 1886. Serial No. 209,678. (No model.)

*To all whom it may concern:*

Be it known that I, MOSES G. HUBBARD, of the city of Philadelphia, county of Philadelphia, and State of Pennsylvania, have invented a new and useful Improvement in Combined Brake and Car-Starter, of which the following is a full, clear, and exact description, reference being had to the accompanying drawings, making part of this specification.

My invention is designed to act as a brake for stopping the car and to aid the horses in starting loaded horse-cars; and it consists in the employment of a long spring coiled longitudinally of and around an accumulator-shaft, and arranged to be acted upon torsionally or circumferentially as an accumulator of force from the momentum of the car, and therewith to aid the team in starting it.

It further consists in the employment of a friction-clutched bevel gear-wheel in constant engagement with the accumulator-shaft and mounted on the car-axle, to be adjusted by the hand of the driver for winding up the spring or force-accumulator, in combination with an automatic or self-clutching bevel gear-wheel mounted on the same axle and adapted to receive the force of the spring to aid in starting the car, by means of which only one motion of the driver's hand is required in stopping and one in starting the car.

It further consists in locating the long coiled spring longitudinally of the car, to permit great length of spring and a convenient connection with the gear-wheels.

It further consists in mounting the long coiled spring on a longitudinal shaft and coiling said spring around said shaft and longitudinally thereof, which bears a bevel-pinion or gear-wheel on one end, engaging constantly with the said clutched bevel gear-wheels on the axle, by means of which the spring will always be wound or twisted in the same direction during either a forward or backward movement of the car.

It further consists in the connection and arrangement of the ends of the said spring, as hereinafter described, by means of which the spring may be clutched or unclutched at either end, or entirely disconnected from the gear-wheels.

It further consists in the manner of constructing the longitudinal shaft and mounting the spring thereon.

It further consists in an arrangement of levers for connecting the said spring with both axles simultaneously, and adapting the spring to act upon both axles simultaneously when greater starting-power is desired.

It further consists in an arrangement of the draft-rods whereby the draft of the team will always set the spring-clutches in proper position to adapt the spring to act in the right direction.

It further consists in an automatic or self-acting friction-clutch for clutching the starting gear-wheel.

It further consists in the construction and arrangement of the hand-lever, combined with the long coiled spring for clutching or unclutching the said spring.

It further consists in an adjustable collar or friction-bearing mounted on the axle, in combination with the adjustable friction-clutch gear-wheel, by means of which the position of the said wheel on the axle may be conveniently adjusted to take up any possible wear of its friction surfaces.

It further consists in the arrangement and location of a friction-clutch on each side of the adjustable gear-wheel for winding up the force-accumulator, by means of which the said wheel will be sufficiently clutched by only a slight pressure on the end of the clutch-lever by the driver.

It further consists in constructing the intermediate frame in such manner as to adapt it to be freely expanded or contracted longitudinally by the varying positions of the axles.

It further consists in the construction and arrangement of the intermediate frame to adapt it to conform to the horizontal and diagonal variations.

It further consists in the improved construction and arrangement of the pawl-and-ratchet clutch connection of the automatic or self-clutching gear-wheel to the axle to attain a quicker take-up of the clutch, thereby saving power and attaining greater durability.

In the accompanying drawings, Figure I is a plan view of so much of a car as is necessary to show my improvement applied to a "single-end" car, or one moving always with the same end in front. Fig. II is a similar view, partly in section, showing the invention applied to a "double-end" car. Fig. III is also a plan view showing the device applied to both axles of a single-end car. Fig. IV is a view of my improved self-acting friction-clutch. Fig. V shows the longitudinal shaft on which the momentum-storing spring is mounted, detached; and Fig. VI is a side elevation of a self-acting backing ratchet or clutch.

I will first describe my invention applied to a car for running in one direction only.

A A are the wheels which carry the car.

B and B' are the axles to which the wheels are attached.

C C represent a portion of the frame of the car mounted upon the axles.

D D are the side sills of the intermediate frame, and d d are the cross-sills thereof.

The force-accumulating spring E is mounted on the longitudinal shaft F in this frame. The said shaft F revolves in the journal-box $f$ at the rear end and in the journal-box $f'$ at the front end, and on the front end of this shaft a bevel-pinion, M, is secured, meshing into both of the bevel-wheels G and H, which are mounted on the forward axle. The wheel G is connected to the axle by an ordinary friction-clutch in such manner as to be clutched or unclutched conveniently by the hand or foot of the driver, and the wheel H is connected to the axle by means of a pawl and ratchet, or by my improved self-acting friction-clutch, (shown detached in Fig. IV,) in such manner as to revolve freely in a direction contrary to the rotation of the car-wheels and instantly become clutched to the axle when revolving in the same direction as the car-wheels.

When the wheel G is clutched to the axle, it revolves with it and winds up or twists the long coiled spring E circumferentially or torsionally, the front end of this spring being attached to the shaft F and the rear end being attached to the rear cross-sill of the frame D. When the spring E is thus being wound or twisted by the momentum of the car in stopping, the resistance of the spring acts as a brake to stop the car, and the two gear-wheels G and H will then hold the spring in this strained position until the wheel G is unclutched by the driver, when the force of the spring will instantly be exerted upon the wheel H and cause it to revolve the axle and start the car.

The wheel G may be clutched and unclutched by a lever pivoted to the frame at one end, as shown at K in Fig. I, and extending forward to connect with a hand-lever or foot-treadle arranged to be conveniently used by the driver; but the wheel H must be attached to the axle by a self-acting clutch, and for this purpose I prefer either a pawl-and-ratchet connection or the self-acting friction-clutch shown in Fig. IV, in which H is the gear-wheel, B the axle, T' and T" are the fixed collars on the axle, and U is a loose or floating collar between the fixed collar T" and the gear-wheel H. On the end of the hub of said gear-wheel I form two or more inclines or cams, $t\ t$, which correspond with and engage two cams on the end of the floating collar U. The ends of floating collar U and stationary collar T" in contact should be tapered and fit together like an ordinary friction-clutch, and the same taper is formed between the wheel H and collar T'. The gear-wheel H will thus tighten or clutch when rotated or turned toward the inclines or cams $t\ t$ of the floating collar U, and loosen or become unclutched when rotated in the opposite direction. The spring is sufficiently strong to act as a brake and stop the car in most cases without the aid of ordinary brakes; but such brakes would sometimes be necessary to stop the car suddenly for emergencies. The said spring E is connected to the shaft F at its front end by a ratchet-connection, so that the spring could not be twisted in the wrong direction and thereby injured, and it can thus be readily disconnected from the said shaft F by the lever L when it is desired to back the car.

To apply my invention to a car for running in both directions, I employ corresponding gear-wheels on both axles, as shown in Fig. II, and attach the spring E to the divided shaft F and F', and by disconnecting the spring E from the shaft F and connecting it to the cross-piece of the frame at N the pinion M' will act upon it precisely as did the pinion M in the previously-described arrangement.

Of course the wheel H' must be clutched or ratcheted to the axle B in the opposite direction to produce the desired effect, and a similar lever, K', extend to that end of the car to work the clutch of the wheel G'.

My invention may also be so applied as to use the one spring or force-accumulator E for acting upon both axles simultaneously when greater power is desired for stopping and starting the car. This application of my invention is shown in Fig. III, in which both of the self-acting wheels H and H' are so ratcheted or clutched as to become clutched or revolve freely in the same direction, and the clutch-lever K is pivoted at its rear end to a lever, P, which extends back to work the clutch of the wheel G' simultaneously with the clutching and unclutching of the wheel G. When these two wheels G and G' are both clutched to the axles, they will both act upon the spring E, the wheel G twisting one end of the spring in one direction and the wheel G' twisting the other end of the spring in an opposite direction, which will wind up the spring to the full capacity of the friction-clutch in half the time required in the previously-described two modifications of my invention, and when these two wheels are unclutched the spring will exert its power upon both of the wheels H and H' and stop or start the car with double the force of the spring. The proportions of these gear-wheels may be varied to vary the power of the spring.

When applied to double-end cars, both ends of the spring E must be attached by a ratchet-connection to the divided shaft F and F' in such manner as to attach and detach it conveniently, and to disconnect it entirely at both ends when desired. For this purpose the lever L may be connected by a rod with the short pivoted arm L', and these two acting together will control the positions and connections of the spring. To avoid the possibility of the driver's forgetting to move this lever to properly connect the spring E when he changes his horses from one end of the car to the other, (on double-end cars,) the draw-bars of the car may be connected with the lever L by draw-rods $l\ l'$ in such manner as to cause the horses to set the spring E in proper position when they first start the car.

The simplest adaptation of my invention, as shown in Fig. I, is applicable to single-end cars; but when applied to double-end cars the modification shown in Fig. II would be preferred.

In the practical application of my invention I find that it is not desirable to make the force-accumulator of sufficient power to start the car suddenly, as that tends to confuse the horses and cause them to balk and work to great disadvantage. It is better to adapt the device to aiding the team in starting the car, and thereby relieve the horses of the excessive strain which so rapidly wears them out. I use small gear-wheels, which will not project sufficiently above the axles to interfere with the bottom of the car-body, and my whole device is therefore light, and by its great simplicity it can be very cheaply made and applied to cars now in use.

The long coiled spring for the force-accumulator has peculiar advantages when acted upon torsionally or circumferentially in converting its great elasticity into a rotary force and applying it directly to the axle of the car, and when this rotary force is communicated through bevel-gearing the adjustable and self-adjusting connection with the axle is attained by the employment of only three gear-wheels. This triple gear not only accomplishes these important results, but while the car is moving forward it also avoids the possibility of winding the spring in the wrong direction under any circumstances.

The adjustable friction-clutch applied to the wheel G is most convenient for instantaneous clutching and unclutching, and as its driving-power is limited by the amount of pressure applied to it, the strain upon the spring is thereby limited, and by combining this with the self-clutching wheel H the operations of stopping and starting the car are performed by one motion of the driver for each operation. This is important, because if the driver is required to perform more than one motion for each operation he becomes confused and fails to perform the operations properly.

Fig. V is a detached view of the longitudinal shaft on which the force accumulator spring is mounted, and shows its construction and arrangement. When used in the modification of my invention shown in Fig. I, it is one continuous shaft extending from the bevel-wheel M to the sill at the opposite end of the intermediate frame, and it has the ratchet-collar R secured to it just in rear of the frame cross-sill to form the ratchet-connection with the spring E. The opposite end of the spring is secured to the rear cross-sill of the said intermediate frame; but when used in the modifications shown in Figs. II and III this shaft is divided at its center, so that the two gear-wheels M and M' can revolve in opposite directions.

S is a tube or thin gas-pipe mounted on this intermediate shaft, of proper size to support the long coiled spring and permit the slight compression or diminished diameter when wound or twisted to its greatest capacity, and this tube serves the additional important purpose of supporting the central ends of the intermediate divided shaft when used in the modifications shown in Figs. II and III.

In order to attain a sufficient driving-power in the adjustably-clutched wheel G by a slight force on the end of the clutched lever K by the driver, I employ a friction-clutch on each side of the wheel, and thereby double its driving-power with a given pressure.

The friction-bearing or collar T' is attached to the axle by set-screws, or in any convenient manner, to permit an endwise adjustment on the axle toward the gear-wheel G to take up any possible wear of the friction-surfaces of the clutches.

The side sills of the intermediate frame may be halved together and secured by joint-clasps Z Z Z Z, Fig. I, to allow the axles to vary slightly in their distance apart without causing them to bind in the journal-boxes of the said frame. This frame should also be slightly elastic horizontally to permit either of the car-wheels to rise or fall independently of the others, and the cross-sills should be secured to the side sills by one bolt at each end to permit the frame to vary diagonally.

To utilize all of the force accumulated in the force-accumulator E to be used in starting the car, it is important that the self-acting clutch or ratchet-and-pawl connection of the wheel H to the axle should be as instantaneous as possible, and for this purpose I employ several pawls so arranged as to engage with the ratchet teeth in quick succession, as shown at $h\ h\ h$ in Fig. VI. This arrangement also increases the durability of the pawls and secures a diminished concussion on the teeth as the pawls engage therewith.

The accumulator-spring hereinbefore described operates with great power and freedom, and at the same time occupies the minimum amount of space, owing to the fact of its being wound longitudinally around the shaft instead of being wound laterally, as has heretofore been the case. By virtue of my improved arrangement of the accumulator-spring each of its coils or convolutions acts without frictional resistance from the others, as is the case where the spring is coiled directly upon itself. Furthermore, when the spring is wound up, its coils are supported directly upon the shaft or its inclosing-tube, so that no injurious strains can affect the spring, and the total expansion of the spring when unwinding is uniformly that of each coil, so that when unwound no great amount of space is needed to accommodate the spring.

Having thus described my invention, I claim as new—

1. The combination of the friction-clutched gear-wheel mounted on the axle and adapted to be adjusted by the driver for winding up the force-accumulator with an automatic or self-clutching gear-wheel mounted on the same axle and adapted to receive the force of the said force-accumulator to aid in starting the car, said gear-wheels being in constant engagement with the accumulator-shaft, substantially as described.

2. The combination of the adjustably-clutched gears for winding a force-accumulator, and self-clutching gears for utilizing the accumulated force, with both axles of a car constructed to be run in both directions, and an accumulator-shaft in constant engagement with said gears, substantially as described.

3. In a car-starter, the long spiral spring coiled longitudinally on a longitudinal shaft, geared constantly between two bevel-wheels, one of which is adjustably clutched to the axle and the other one of which is self-clutching, and both of which remain always in gear with the shaft to which said spring is connected, substantially as described.

4. The spiral spring attached at its ends to the longitudinally-arranged shaft by ratchet-clutches for clutching or unclutching either end, or entirely disconnecting both ends, and coiled longitudinally upon said shaft, in combination with gearing connecting said shaft with the axle, substantially as and for the purposes set forth.

5. In a car-starter, the combination, with the longitudinally-arranged force-accumulating spring, and the separable clutches at the ends thereof, of the connected pivoted levers engaging said clutches, and the draft-rods connected to said levers, whereby the draft of the team is caused to set the clutches, substantially as described.

6. In a car-starter, the automatic or self-acting friction-clutch constructed substantially as described and shown, in combination with the starting gear-wheel.

7. The hand-lever, in combination with the coiled spring, and ratchet-clutches at the ends of said spring for clutching said spring to or unclutching it from the longitudinal shaft on which said spring is mounted, substantially as described.

8. The adjustable friction bearing or collar mounted on the axle, in combination with the adjustable friction-clutched gear-wheel for adjusting its position and taking up the wear of its friction-clutch.

9. The combination of the intermediate shaft and tube with the long spiral spring coiled longitudinally upon said tube, substantially as and for the purpose specified.

10. The combination, in a car-starter, of the adjustably-clutched gear-wheel provided with a friction-clutch on each side and a self-clutching gear-wheel, substantially as and for the purpose described.

11. The intermediate frame constructed, as described, to permit horizontal or diagonal variations.

12. In a car-starter, the force-accumulator, in combination with the starting gear-wheel, clutched by means of the ratchet and several pawls, constructed and arranged substantially as and for the purposes described.

13. In a combined car brake and starter, the car-axle, and a pair of gear-wheels mounted loosely thereon and clutching therewith in opposite directions, the clutching action of one of said wheels being automatic, in combination with an accumulator-shaft carrying an accumulator-spring and geared in constant engagement with the axle-gears, substantially as set forth.

14. In a combined car brake and starter, the car-axle, and a pair of gear-wheels mounted loosely thereon and clutching therewith in opposite directions, the clutching action of one of said gears being automatic, in combination with a longitudinal shaft carrying a spiral spring coiled longitudinally thereon and geared constantly to the axle-gears, and lever-connections from the clutch of the remaining axle-gear to the driver's position for clutching and unclutching said gear, substantially as specified.

15. In a combined car brake and starter, an accumulator-shaft geared to connect with gearing upon the car-axle, in combination with a sleeve surrounding said shaft and an accumulator-spring surrounding the sleeve, substantially as set forth.

In testimony whereof I have hereunto set my hand this 16th day of July, A. D. 1886.

MOSES G. HUBBARD.

Witnesses:
M. G. HUBBARD, Jr.,
E. R. HUBBARD.